US012750708B2

(12) United States Patent
Cheng et al.

(10) Patent No.: US 12,750,708 B2
(45) Date of Patent: Sep. 29, 2026

(54) METHOD AND DEVICE FOR L1 MEASUREMENT AND REPORTING FOR L1/L2-BASED MOBILITY

(71) Applicant: Samsung Electronics Co., Ltd., Gyeonggi-do (KR)

(72) Inventors: Yuan-Sheng Cheng, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 303 days.

(21) Appl. No.: 18/420,217

(22) Filed: Jan. 23, 2024

(65) Prior Publication Data

US 2024/0276266 A1 Aug. 15, 2024

Related U.S. Application Data

(60) Provisional application No. 63/594,571, filed on Oct. 31, 2023, provisional application No. 63/446,214, filed on Feb. 16, 2023, provisional application No. 63/444,709, filed on Feb. 10, 2023.

(51) Int. Cl.

| | |
|---|---|
| ***H04W 24/10*** | (2009.01) |
| ***H04B 7/06*** | (2006.01) |
| ***H04W 72/1268*** | (2023.01) |
| ***H04W 72/232*** | (2023.01) |

(52) U.S. Cl.

CPC .......... *H04W 24/10* (2013.01); *H04B 7/0626* (2013.01); *H04W 72/1268* (2013.01); *H04W 72/232* (2023.01)

(58) Field of Classification Search

CPC ........................... H04W 24/10; H04W 72/232; H04W 72/1268

See application file for complete search history.

(56) References Cited

U.S. PATENT DOCUMENTS

| | | | | |
|---|---|---|---|---|
| 2015/0103764 | A1 | 4/2015 | Deng et al. | |
| 2015/0208266 | A1 | 7/2015 | Jung et al. | |
| 2015/0319667 | A1 | 11/2015 | Dalsgaard et al. | |
| 2017/0053478 | A1 | 2/2017 | Wudtke et al. | |
| 2019/0199420 | A1* | 6/2019 | Faxér .................... | H04L 1/0026 |
| 2023/0180077 | A1 | 6/2023 | Cui et al. | |
| 2023/0189046 | A1* | 6/2023 | Liu ..................... | H04W 72/566 370/329 |

OTHER PUBLICATIONS

ETSI TS 138 331 V17.0.0, 3GPP TS 38.331 version 17.0.0 Release 17, ETSI, May 2022. (Year: 2022).*

(Continued)

*Primary Examiner* — Sam Bhattacharya

(74) *Attorney, Agent, or Firm* — The Farrell Law Firm, P.C.

(57) ABSTRACT

A method and an apparatus are provided in which it is detected that a condition for triggering a layer-1 (L1) measurement report transmission is satisfied based on a layer-3 (L3) measurement. It is determined whether the condition is detected over a first duration based on an L1 measurement, in response to detecting that the condition is satisfied based on the L3 measurement, and the measurement report is transmitted in case that the condition is detected over the first duration.

20 Claims, 8 Drawing Sheets

(56) References Cited

OTHER PUBLICATIONS

ETSI TS 138 214 V16.4.0, 3GPP TS 38.214 version 16.4.0 Release 16, ETSI, Jan. 26, 2021 (Year: 2021).*
3GPP TS 38.331 V17.2.0 (Sep. 2022), pp. 1304.
3GPP TS 38.133 V18.0.0 (Dec. 2022), pp. 5862.
Ericsson, "L1 enhancements to inter-cell beam management", 3GPP TSG-RAN WG1 Meeting #111 Tdoc R1-2211053 Toulouse, France, Nov. 14-18, 2022, pp. 13.
3GPP TS 38.214 V17.3.0 (Sep. 2022), pp. 232.

* cited by examiner

METHOD AND DEVICE FOR L1 MEASUREMENT AND REPORTING FOR L1/L2-BASED MOBILITY

CROSS-REFERENCE TO RELATED APPLICATION(S)

This application claims the priority benefit under 35 U.S.C. § 119(e) of U.S. Provisional Application Nos. 63/444,709, 63/446,214, and 63/594,571, filed in the U.S. Patent and Trademark Office on Feb. 10, 2023, Feb. 16, 2023, and Oct. 31, 2023, respectively, the disclosures of which are incorporated by reference in their entirety as if fully set forth herein.

TECHNICAL FIELD

The disclosure generally relates to serving cell changes in a mobile communication system. More particularly, the subject matter disclosed herein relates to improvements to layer-1 (L1) measurement and reporting in L1/layer-2 (L2) mobility.

SUMMARY

In the current 5$^{th}$ generation (5G) new radio (NR) system, movement of a user equipment (UE) between coverage areas of different cells requires a serving cell change. Currently, a serving cell change is triggered by layer 3 (L3) measurements and is performed through a reconfiguration and synchronization triggered by radio resource control (RRC) signaling. The reconfiguration and synchronization enables the change of a primary cell (PCell) and a primary secondary cell group (SCG) cell (PSCell), as well as the release or addition of secondary cells (SCells) when applicable.

One issue with the above approach is that the serving cell change, which involves complete L2 and L1 resets, leads to longer latency, higher overhead, and longer interruption time than beam switch mobility.

To solve this problem, L1/L2 mobility enhancements may allow a serving cell change via L1/L2 signaling in order to reduce the latency, overhead, and interruption time. In order to change serving cells without L1/L2 being completely reset, some L1/L2 configuration of non-serving cells (e.g., candidate target PCells) should be included in current RRC configurations, before the handover (or the L1/L2-based serving cell change) conditions are triggered.

Systems and methods are provided herein to enhance L1 measurement and reporting.

This approach improves on previous methods because it eliminates the latency associated with a random access channel (RACH) procedure during the handover.

In an embodiment, a method is provided in which a UE detects that a condition for triggering an L1 measurement report transmission is satisfied based on an L3 measurement. The UE determines whether the condition is detected over a first duration based on an L1 measurement, in response to detecting that the condition is satisfied based on the L3 measurement, and transmits the measurement report in case that the condition is detected over the first duration.

In an embodiment, a UE is provided that includes a processor and a non-transitory computer readable storage medium that stores instructions. When executed, the instructions cause the processor to detect that a condition for triggering an L1 measurement report transmission is satisfied based on an L3 measurement, determine whether the condition is detected over a first duration based on an L1 measurement, in response to detecting that the condition is satisfied based on the L3 measurement, and transmit the measurement report in case that the condition is detected over the first duration.

In an embodiment, a method is provided in which a UE determines whether a condition for triggering an L1 measurement report transmission is held for a first duration, based on an L3 measurement, and is detected over a second duration, based on an L1 measurement. The UE transmits the measurement report in case that the condition is held for the first duration and detected over the second duration.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
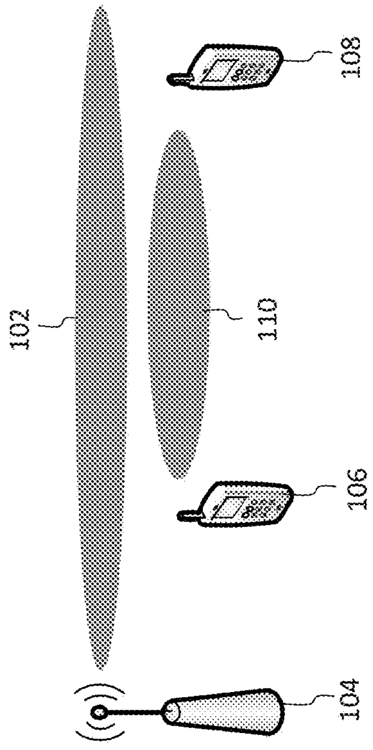
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station, AP, or a gNode B (gNB) 104, a first UE 106, and a second UE 108. A data path 110 may enable the transmission of data (and some control information) between the first UE 106 and the second UE 108. The control path 102 and the data path 110 may be on the same frequency or may be on different frequencies.

In NR, a network may use dedicated signaling to configure a UE in an RRC-connected mode to perform and report measurements. L3 measurements may include NR measurements, inter-radio access technology (RAT) measurements (e.g., reporting measurement objects from LTE), and NR sidelink measurements of L2 UE-to-network (U2N) relay UEs.

NR measurement may be configured in terms of a reference signal received power (RSRP)/reference signal received quality (RSRQ) or a signal to interference and noise ratio (SINR) on either a synchronization signal block (SSB) or a channel state information (CSI)-reference signal (RS). Measurements may be provided and reported at L1 and L3. An L1 measurement may be part of a CSI report. An L3 measurement may be a filtered version of an L1 measurement, sent through an RRC message. The configurations for measurement may include measurement identities, measurement objects, reporting configurations, quantity configurations, and measurement gap configurations.

Measurement objects may include a list of objects on which the UE may perform the measurements. Reporting configurations may include a list of reporting configurations. There may be one or more reporting configurations per measurement object. Each measurement reporting configuration may consist of a reporting criterion, an RS type, and a reporting format.

The reporting criterion may trigger the UE to send a measurement report. This may occur periodically or as a single event. The RS type may be used by the UE for beam and cell measurement results (e.g., synchronization signal (SS)/physical broadcast channel (PBCH) block or CSI-RS). The reporting format may indicate the quantities per cell and per beam that the UE includes in the measurement report (e.g., RSRP), as well as other associated information, such as the maximum number of cells and the maximum number beams per cell to report.

For measurement reporting, each measurement identity in a list links a single measurement object with a single reporting configuration. The quantity configuration may define a measurement filtering configuration used for all event evaluation and related reporting, and for periodical reporting of that measurement. Measurement gaps are periods that the UE may use to perform measurements.

Measurements may be filtered in L3 filtering to remove the impact of fast fading. The L3 filter may be an infinite impulse response (IIR) filter as shown in Equation (1) below.

$$F_n = (1 - a) * F_{n-1} + a * M_n \quad (1)$$

$M_n$ is the latest received measurement result from the physical layer. $F_n$ is the updated filtered measurement result that is used for evaluation of reporting criteria or for measurement reporting. $F_{n-1}$ is the old, filtered measurement result, where $F_0$ is set to $M_1$ when the first measurement result from the physical layer is received. For MeasObjectNR, $a=1/2^{(ki/4)}$, where $k_i$ is the filterCoefficient for the corresponding measurement quantity of the $i^{th}$ QuantityConfigNR in quantityConfigNR-List, and i is indicated by quantityConfiglndex in MeasObjectNR.

L3 filtering may take the inputs from L1 measurements and output information to be used in L3 measurement reports.

An L3 measurement report may be periodic or event-triggered. The information element (IE) ReportConfigNR may specify criteria for triggering an NR measurement reporting event when reportType is set to a specific event. The events related to NR mobility may be defined as Ax events for a measurement report. A brief description of Ax events are listed in Table 1 below.

TABLE 1

| | |
|---|---|
| Event A1: | Serving becomes better than absolute threshold. |
| Event A2: | Serving becomes worse than absolute threshold. |
| Event A3: | Neighbor becomes amount of offset better than PCell/PSCell. |
| Event A4: | Neighbor becomes better than absolute threshold. |
| Event A5: | PCell/PSCell becomes worse than absolute threshold1 AND Neighbor/SCell becomes better than another absolute threshold2. |
| Event A6: | Neighbor becomes amount of offset better than SCell. |

There may not be an explicit specification of when or how a network will use the events described above. It may be up to the network to configure a UE specific event triggered report to an individual UE. For example, an A1 event may be used to cancel an ongoing mobility procedure. An A2 event may be used to trigger a mobility procedure when a UE moves towards cell edge.

An A3 event may be used for intra-frequency or inter-frequency handover procedures. A UE may be configured with measurement gaps and an A3 event for inter-frequency handover may be used after an A2 event has triggered. An A3 event provides a handover triggering method based on a relative measurement result (e.g., an A3 event may be triggered when the RSRP of a neighboring cell is stronger than the RSRP of a special cell).

An A4 event may be used for mobility procedures without dependance on a coverage of the current serving cell. For example, load balancing procedures may take the decision to move a UE away from current serving cell due to load conditions rather than radio conditions.

An A5 event may be used for intra-frequency or inter-frequency handover. A UE may be configured with measurement gaps and an A5 event for inter-frequency handover may be used after an A2 event has triggered. An A5 event provides a handover triggering mechanism based on absolute measurement results. It may be used to trigger a time critical handover when a current special cell becomes weak and it is necessary to change to another cell that may not satisfy the criteria for an A3 event handover.

An A6 event may be used for a secondary cell swap procedure.

Accordingly, A1 and A2 events may cause a UE to enter or leave a mobility procedure. An A6 event may be used for an SCell swapping procedure. A3 to A5 events may be used to trigger a handover. Given that an A4 event may be used for a load balance purpose, A3 and A5 events may be typically seen in the field.

Events may be configured independently, and a UE may monitor all configured events simultaneously. A3-A5 events may be configured through RRC reconfiguration after an A2 event is triggered.

An event triggered report only occurs in L3 measurement reporting, where an L1 measurement report is configured as CSI reporting, and can be either periodic, semi-periodic, or a-periodic through a physical uplink control channel (PUCCH) or a physical uplink shared channel (PUSCH). For L1/L2 triggered mobility (LTM), an amount of information associated with candidate measurement objects (or beams) may be larger than a conventional L1 measurement, since it includes objects in neighborhood cells. Similar event triggered mechanisms for an L1 measurement report may also be introduced for LTM.

As described above, for L3 events triggering measurement reports, A1 and A2 events may be designed for an entering or non-entering mobility procedure, and A3 to A5 events may be configured to achieve different scenarios for a mobility environment.

A1/A2 events may be designed for long term conditions with respect to whether a UE is in an environment leading to handover, and may not be necessary to incorporate with LTM. The same A1/A2 events based on an L3 measurement may be used as a trigger configuration for LTM, if both a network and a UE support LTM. However, design targets for these scenarios (i.e., A3-A5) may be applied to LTM, allowing the structure of a triggering condition for A3-A5 events to be reused in LTM.

Therefore, according to an embodiment, for LTM event-triggered reporting, events may be supported that are analogous trigger conditions of A3-A5 events in an L3 measurement report.

For example, using an A5 event as an event configuration for an L3 measurement report, the A5 event may be configured by IE eventA5 in RRC, as shown in Table 2 below.

TABLE 2

```
eventA5                         SEQUENCE {
      a5-Threshold1                   MeasTriggerQuantity,
      a5-Threshold2                   MeasTriggerQuantity,
      reportOnLeave                     BOOLEAN,
      hysteresis                      Hysteresis,
      timeToTrigger                     Time ToTrigger,
      useAllowedCellList                  BOOLEAN
   },
MeasTriggerQuantity ::=              CHOICE {
   rsrp                         RSRP-Range,
   rsrq                         RSRQ-Range,
   sinr                         SINR-Range
}
```

The IE eventA5 may include two thresholds, a5-Threshold1 and a5-Threshold2, as well as a value Hysteresis. The two thresholds may be based on RSRP/RSRQ or SINR measurement. Hysteresis is an offset value to reduce a ping-pong effect during handover.

TimeToTrigger is a time duration for criteria of the event that needs to be met in order to trigger a measurement report. The two inequalities A5-1 and A5-2 may be held for at least as long as the duration of TimeToTrigger in order to trigger the A5 event. The conditions A5-1 and A5-2 are shown in Table 3 below.

reportOnLeave is a binary variable indicating whether or not the UE may initiate the measurement reporting procedure when the leaving condition is met for a cell in cellsTriggeredList. useAllowedCellList is a binary variable indicating whether only the cells in the allow-list of the associated measObject are applicable. Ofn and Ocn in conditioned inequality are frequency and cell specific offset parameters configured by a network.

TABLE 3

| |
|---|
| Inequality A5-1 (Entering condition 1) |
| Mp + Hys < Thresh1 |
| Inequality A5-2 (Entering condition 2) |
| Mn + Ofn + Ocn − Hys > Thresh2 |
| Inequality A5-3 (Leaving condition 1) |
| Mp − Hys > Thresh1 |
| Inequality A5-4 (Leaving condition 2) |
| Mn + Ofn + Ocn + Hys < Thresh2 |
| Mp is the measurement result of the NR SpCell, not taking into account any offsets. |
| Mn is the measurement result of the neighboring cell, not taking into account any offsets. |
| Ofn is the measurement object specific offset of the neighbor cell (i.e., offsetMO as defined within measObjectNR corresponding to the neighbor cell). |
| Ocn is the cell specific offset of the neighbor cell (i.e., cellIndividualOffset as defined within measObjectNR corresponding to the neighbor cell), and set to zero if not configured for the neighbor cell. |
| Hys is the hysteresis parameter for this event (i.e., hysteresis as defined within reportConfigNR for this event). |
| Thresh1 is the threshold parameter for this event (i.e., a5-Threshold1 as defined within reportConfigNR for this event). |
| Thresh2 is the threshold parameter for this event (i.e., a5-Threshold2 as defined within reportConfigNR for this event). |
| Mn, Mp are expressed in dBm in case of RSRP, or in dB in case of RSRQ and RS-SINR. |
| Ofn, Ocn, Hys are expressed in dB. |
| Thresh1 is expressed in the same unit as Mp. |
| Thresh2 is expressed in the same unit as Mn. |

The technical reasons for the parameters in event-triggered conditions (e.g., Thresh1, Thresh2, Ofn, Ocn, Hys) for an L3 measurement-based event may remain valid when the underlying measurement becomes an L1 measurement. However, a time-to-trigger mechanism may require revisions.

Details of a triggered mechanism for LTM based on different conditions are described below. For example, events may be based only on an L1 measurement, with or without filtering, or based on both L1 and L3 measurements.

L1 measurement filtering may be dependent on UE implementation and the filter may not be explicitly defined. A UE may design its own filter as long as the L1 measurement results satisfy a radio access network (RAN) working group 4 (WG4) (RAN4) requirement.

An event triggered measurement report may use an L3 measurement, which is the output of L3 filtering on top of L1 measurement results (which may already be filtered). The underlining reason for this additional filtering is that the handover (or cell reselection) is determined based on the longer term statistics of the channel for the cells. A gNode B (gNB) may have the freedom to set specific filter parameters corresponding to “no filtering”.

Another difference between L1 measurement results and L3 measurement results is the that the L1 measurement results are beam-based measurements and the L3 measurement results are cell-based measurements (which are derived from beam-based measurement results).

There may not be a clear mechanism for a physical layer to access higher layer data, such as L3 measurement results. For LTM, in order to define an event-triggered mechanism, the measurement used for triggering the event may be based on a current L1 measurement. However, in order to obtain the benefits of using longer term statistics, a new L1 filter may be defined to reduce a ping-pong effect. This L1 filter may be defined on top of existing L1 measurement results (which may already be filtered). This approach provides back compatibility to other L1 measurements. The function of this filter may be similar to the function of L3 filtering. The filter may be defined based on a predetermined input rate. A UE may design the filter to have the same time response as the filter with the different rate for input. Accordingly, a network may configure a shorter memory for the L1 filter compared to that for the L3 filter. Additionally, it may be possible to define a new mechanism for accessing L3 measurement results in L1, and use those as at least part of the criteria for trigger events.

Therefore, according to another embodiment, for LTM event-triggered reporting based on L1 measurement, a trigger mechanism (e.g., parameters, conditions) similar to that of L3 A3-A5 events may be supported.

Parameters such as Thresh1/Thresh2/Ofn/Ocn/Hys may be configurable by the gNB. The metric (or measurement) for triggering the events may be based on existing L1 measurement results, L1 measurement results with additional filtering, both existing L1 measurement results and L1 measurement results with additional filtering, or existing L1 measurement results or L1 measurement results with additional filtering, with L3 measurement results.

Therefore, according to another embodiment, if an L1 filter is defined and used for LTM, it may be applied on top of existing L1 measurement results. The filter may be defined with a predefined input rate. A UE may implement the filter to match a time response of the filter with different input rate.

An L1 measurement may capture more short-term dynamic measurements (e.g., suitable for a beam management application) and an L3 measurement may obtain a more stable measurement (e.g., suitable for mobility procedure). If both measurements can be used for event trigger conditions, benefits from both approaches may be realized.

Due to the dynamic nature of the L1 measurement, a mechanism in current Ax events may need to be revised. For example, in an A5 event, a measurement needs to simultaneously satisfy A5-1 and A5-2 for more than a timeToTrigger duration in order to trigger the event. A UE might enter and leave the conditions frequently when compared to an L3 measurement at the same periods. If both L1 measurement and L3 measurement results are used to trigger an event, the triggered conditions may be relaxed based on the L1 measurement. For example, when the conditions based on an L3 measurement need to last for the timeToTrigger duration in order to trigger the event, the conditions may only need to hold for a portion of timeToTrigger in terms of L1 measurement.

Figure 2:
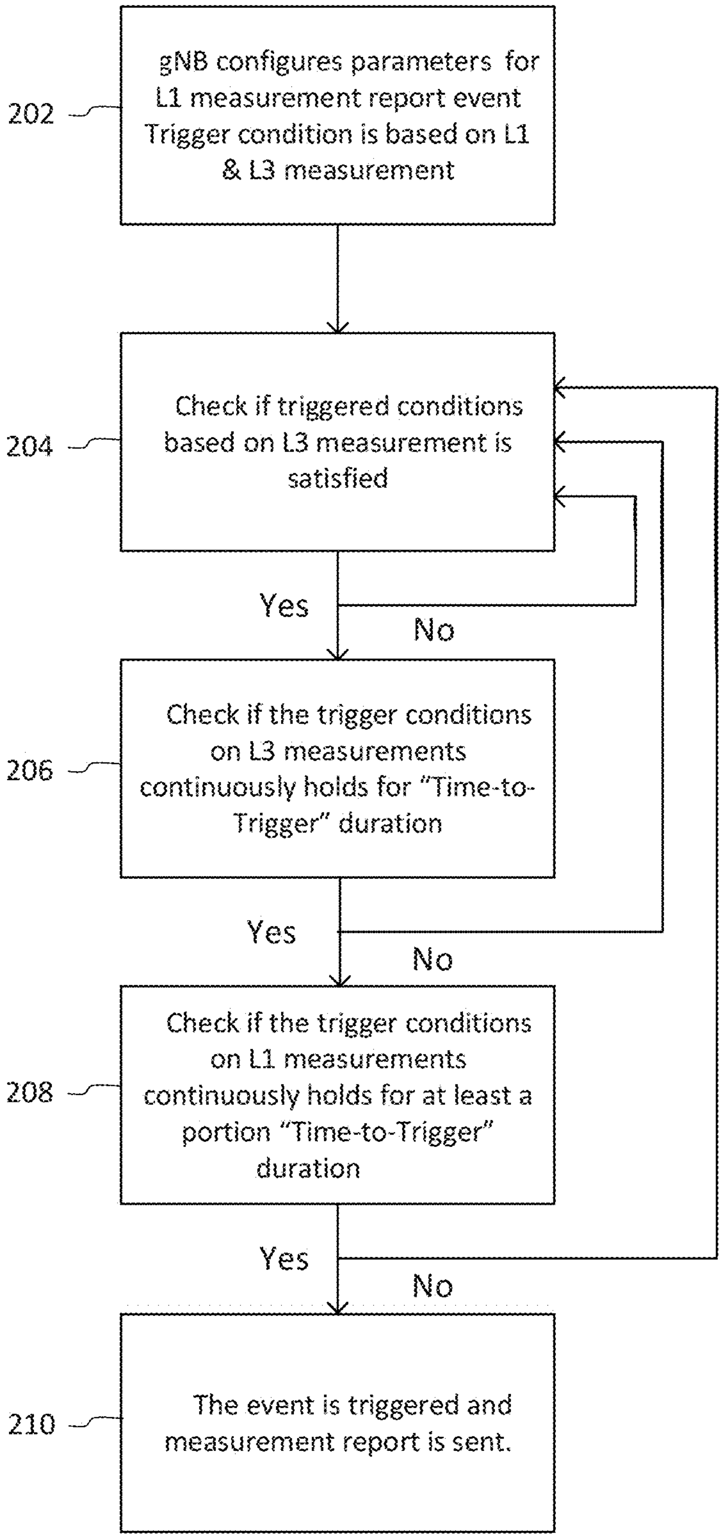
FIG. 2 is a flowchart illustrating a method for triggering an L1 measurement report based on L1 and L3 measurements, according to an embodiment.

FIG. 2 is a flowchart illustrating a method for triggering an L1 measurement report based on L1 and L3 measurements, according to an embodiment. At 202, a gNB may configure parameters for an L1 measurement report event. A trigger condition is based on L1 and L3 measurements. At 204, a UE may determine whether a trigger condition based on an L3 measurement is satisfied. If the trigger condition is satisfied, the UE may determine whether the trigger condition based on the L3 measurement is held continuously for a time-to-trigger duration, at 206. If the trigger condition is not held continuously for the duration, the methodology returns to 204.

If the trigger condition is held continuously for the duration, the UE may determine whether the trigger condition based on an L1 measurement is detected over at least a portion of the time-to-trigger duration, at 208. The trigger condition based on an L1 measurement may be held continuously or non-continuously for at least the portion of the time-to-trigger duration. If the trigger condition is detected over the portion of the duration, the methodology returns to 204. If the trigger condition is not detected over the portion of the duration, the event may be triggered and the UE may send the measurement report, at 210.

Therefore, according to another embodiment, for LTM event-triggered reporting based on an L1 measurement, a trigger mechanism may be supported based on an L1 measurement (or a new filtered L1 measurement) and an L3 measurement, considering the following details. There may be two sets of configurable event parameters for the L1 measurement (or the new filtered L1 measurement) and the L3 measurement. The event-triggered conditions based on the L3 measurement may be fulfilled over the Time-To-Trigger duration in order to trigger the event. The event-triggered conditions based on the L1 measurement (or the new filtered L1 measurement) may only need to be fulfilled over a portion of the Time-to-Trigger duration in order to trigger the event. The amount of portion may be configurable by a network. Time-To-Trigger is a configurable event parameter as in L3 event trigger reports.

An L3 measurement is a cell-based measurement and an L1 measurement (including the filtered L1 measurement) is a beam-based measurement. A goal for LTM is to switch to a best beam, so it makes sense for a measurement to be based on beams. Considering the different nature of L1 and L3 measurements, a two steps trigger mechanism may be used. Results of an L3 measurement may trigger an event trigger mechanism based on L1 measurement. For example, an A1 event may be reused to trigger the event-triggered L1 measurement report.

Figure 3:
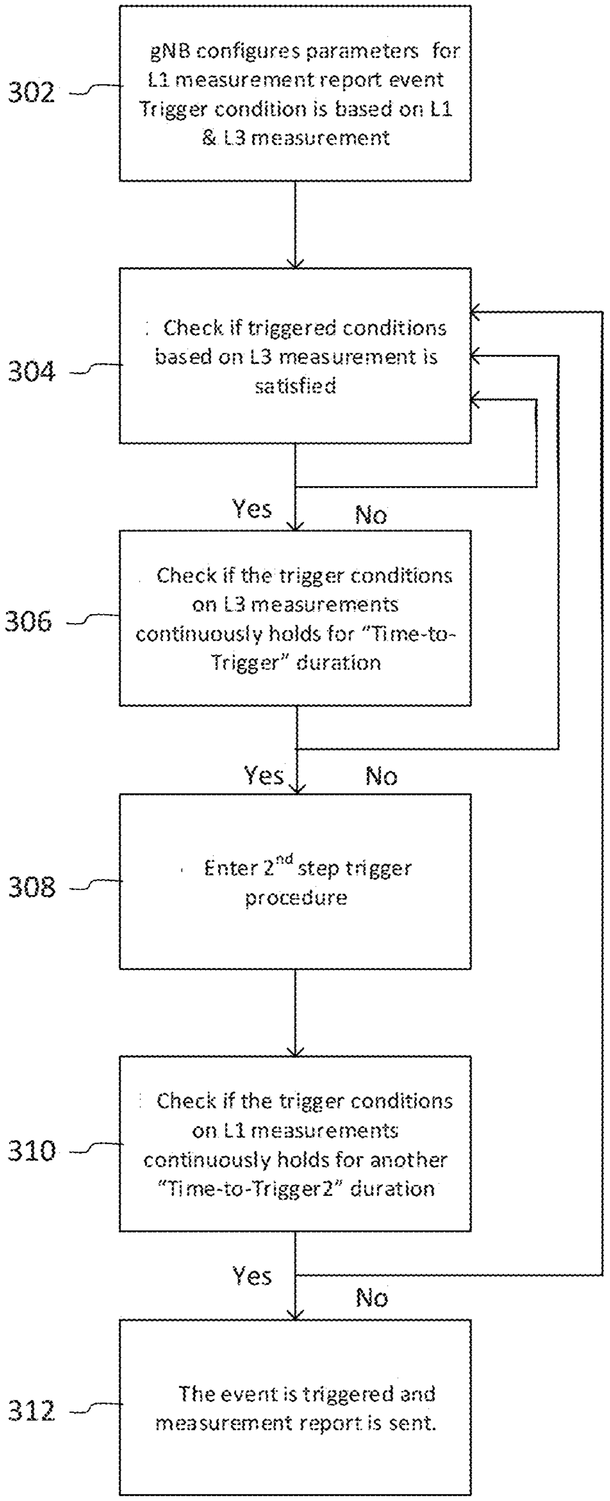
FIG. 3 is a flowchart illustrating a two-step method for triggering an L1 measurement report based on L1 and L3 measurements, according to an embodiment.

FIG. 3 is a flowchart illustrating a two-step method for triggering an L1 measurement report based on L1 and L3 measurements, according to an embodiment. At 302, a gNB may configure parameters for an L1 measurement report event. A trigger condition is based on L1 and L3 measurements. At 304, a UE may determine whether the trigger condition based on an L3 measurement is satisfied. If the trigger condition is satisfied, the UE may determine if the trigger condition based on the L3 measurement is held continuously for a first time-to-trigger duration, at 306. If the trigger condition is not held continuously for the first duration, the methodology returns to 304.

If the trigger condition is held continuously for the first duration, the UE may begin a second step of the trigger procedure, at 308. At 309, the UE may determine whether the trigger condition, based on an L1 measurement, is held continuously for a second time-to-trigger duration, which is after the first time-to-trigger duration. If the trigger condition is not held continuously for the second duration, the methodology returns to 304. If the trigger condition is held continuously for the second duration, the event may be triggered and the UE may send the measurement report, at 312.

Therefore, according to another embodiment, for LTM event-triggered reporting based on an L1 measurement, a two-step trigger mechanism may be supported based on an L1 measurement (or a new filtered L1 measurement) and L3 measurement, considering the following details. There may be two sets of configurable event parameters for the L1 measurement (or the new filtered L1 measurement) and the L3 measurement. The first step of the event-triggering mechanism may be based on L3 measurement. This event may be used to trigger (or stop) the second step of the event-triggering mechanism that is based on the L1 measurement.

Alternatives may be used for L1 filtering of L1 measurement metrics used to condition triggered events. A UE may measure an L1 measurement based on measurement results from preconfigured downlink (DL)-RSs (e.g., an SSB or a CSI-RS), which are discrete time instants in time. As described above, it may be assumed that the L1 measurement is a continuous metrics in the time domain based on a filtered version of an individual L1 measurement at the associated RSs. This is similar to L1 and L3 measurements defined in NR.

Alternatively, given the discrete nature of the DL-RS, the L1 measurement metric may be defined based on a count of instants during a certain timeframe, where the instants are time instants at DL-RS used for measurement. Additionally, the conditions that triggered the events may be based on the number of instants that the conditions satisfied. This affects the conditions that triggered the events.

Various options may be available for triggering the events based on this type of metric, such as, a time-to-trigger timer. The event may be triggered after certain number of instants $N_1$ that the conditions are met during a time duration, time-to-trigger, starting from the first time instant when the condition is satisfied. The event may be triggered at the end of the time-to-trigger duration or at the $N_1^{th}$ time instant.

Another option for triggering the events may be based on a predefined time-to-triggered window based on the timeline (described in greater detail below). The event may be triggered after certain number of instants $N_2$ that the conditions are satisfied within the predefined windows in the timeline.

An additional option for triggering the events may be based on a number of continuous instants. The event may be triggered after the conditions are satisfied for $N_3$ consecutive times. The timing event may be triggered at the $N_3^{th}$ time instant.

The conditions described above may be any condition similar to those of A3-A5 events (e.g., L1-RSRP for serving cell is lower than certain threshold).

Therefore, according to another embodiment, for an event-triggered report based on an L1 measurement, the events may be triggered based on the number of instants the conditions satisfied.

With respect to the timeline for an event-triggered L1 measurement report, an L1 measurement report may be part of the CSI report, which belongs in the category of uplink control information (UCI). The L1 measurement report may be either semi-persistent or aperiodic. The semi-persistent L1 measurement report may be based on either PUCCH or PUSCH, and the aperiodic L1 measurement report may be based on PUSCH.

The semi-persistent report on PUCCH may be down-prioritized because it lacks the flexibility to adopt to a potentially large volume of content for measurement reports for LTM. A MAC CE may also be used as a content carrier for an LTM measurement report.

A timeline of event-triggered L1 measurement reports by different content carriers is described in greater detail below.

When UCI is used as the report carrier, semi-persistent CSI reports may be periodically sent by PUSCH to a gNB after being triggered by DCI. When a semi-persistent CSI report is used as a carrier for an event-triggered LTM report, the report may only need to be sent when the event-triggered condition is fulfilled. Since it is better for the content in the report (e.g., L1 measurements) to be as updated as possible, the time-to-trigger windows should be as close as possible to the actual report.

Figure 4:
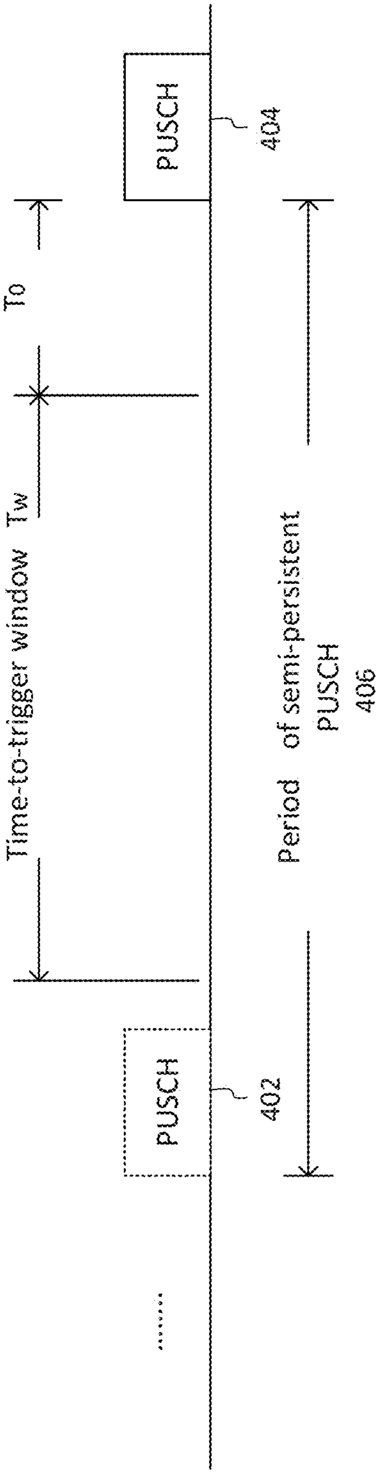
FIG. 4 is a diagram illustrating a time-to-trigger window for a semi-persistent CSI report, according to an embodiment.

FIG. 4 is a diagram illustrating a time-to-trigger window for a semi-persistent CSI report, according to an embodiment.

Referring to FIG. 4, a first PUSCH 402 and a second PUSCH 404 are separated by a period 406. A time-to trigger window is the duration $T_w$ before the starting symbol of the second PUSCH 404, where $T_0$ is a gap for CSI processing and PUSCH preparation time. The second PUSCH 404 may only transmit if the event trigger condition is fulfilled during the time-to-trigger window $T_w$. Both $T_w$ and $T_0$ may be configured by the network subject to UE capability, including the capability for CSI processing time. Although FIG. 4 shows that the time-to-trigger window does not overlap with first PUSCH 402, it is possible for the window to overlap one or more previous PUSCH occasions.

Alternatively, $T_w$ may be implicitly determined by the configuration of PUSCH and $T_0$. For example, the $T_w$ associated with the $N^{th}$ PUSCH may be the defined as the duration starting at $T_0$ before $(N-1)^{th}$ PUSCH and ending with $T_0$ before $N^{th}$ PUSCH.

There may be different approaches with respect to the continuity of sending reports. In a first approach each PUSCH instance may be treated independently (i.e., the trigger condition may be checked every PUSCH instance in order to determine whether to send the report). Alternatively, a UE may continue sending the report once the trigger condition is fulfilled in earlier PUSCH instance, and stop the reporting when indicated by the network, when a leaving condition is fulfilled, or after a preconfigured number of report have been sent.

Therefore, according to another embodiment, for an event-triggered LTM L1 measurement report sent via semi-persistent CSI on PUSCH, a UE may not send measurement results at certain PUSCH instant when the triggered condition is not fulfilled in the associated time-to-trigger windows.

With the above-described approach, a resource allocated for a semi-persistent report is occupied even when the report is not sent. It may be beneficial to save UE power by not sending all the reports.

An event may be triggered based on continuous monitoring in the time domain. Additionally, the event may be triggered when the triggering conditions are satisfied for a continuous time-to-trigger duration. A UE may use an earliest available PUSCH occasion to transmit. The available PUSCH occasions are defined as PUSCHs $T_0$ after the event is triggered. $T_0$ is to ensure that the UE has enough processing time for report preparation. $T_0$ may be configured by the network subject to UE capability.

When UCI is used as the report carrier, an aperiodic CSI report may be triggered by the same DCI scheduling a PUSCH resource. To combine an event-triggered measurement report and aperiodic CSI, a UE may withhold the measurement results without sending the measurement report, when the triggered condition is not satisfied.

Figure 5:
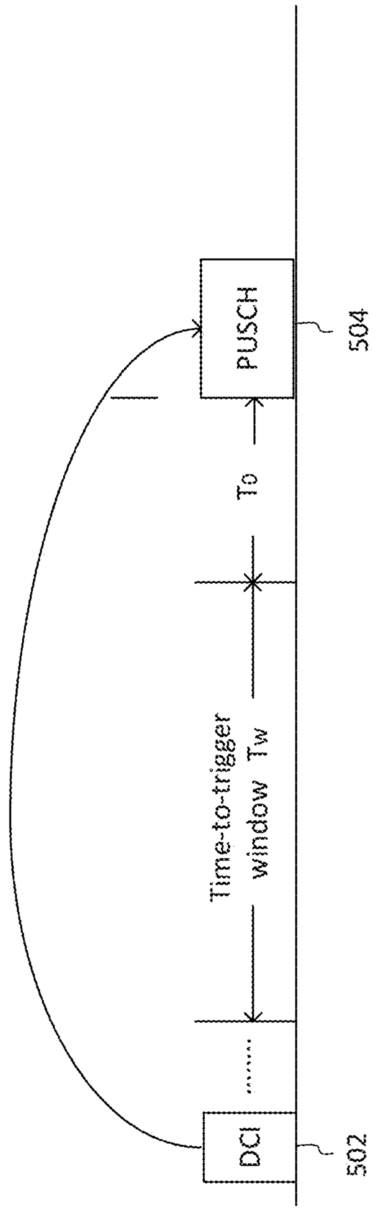
FIG. 5 is a diagram illustrating a time-to-trigger window for an aperiodic CSI report, according to an embodiment.

FIG. 5 is a diagram illustrating a time-to-trigger window for an aperiodic CSI report, according to an embodiment. The timeline for triggering is similar to that of the semi-persistent CSI report by PUSCH, as described above with respect to FIG. 4. A DCI 502 is shown that schedules a PUSCH 504. A time-to trigger window is the duration $T_w$ before the starting symbol of the PUSCH 504, where $T_0$ is a gap for CSI processing and PUSCH preparation time. The PUSCH 504 may only transmit if the event trigger condition is fulfilled during the time-to-trigger window $T_w$.

Therefore, according to another embodiment, for an event-triggered LTM L1 measurement report sent via an aperiodic CSI, a UE may withhold the measurement results without sending the measurement report at the scheduled PUSCH allocation when the triggered condition is not fulfilled in the associated time-to-trigger window.

Based on the above-described approach, a drawback of resource wasting is observed, similar that described above for the semi-persistent CSI report. In another approach, a network-configured dedicated scheduling request (SR) resource for the LTM report may be sent when the event is triggered. A UE may send the SR via a dedicated resource. A gNB may then send DCI to trigger a corresponding aperiodic CSI report associated with the LTM report.

Figure 6:
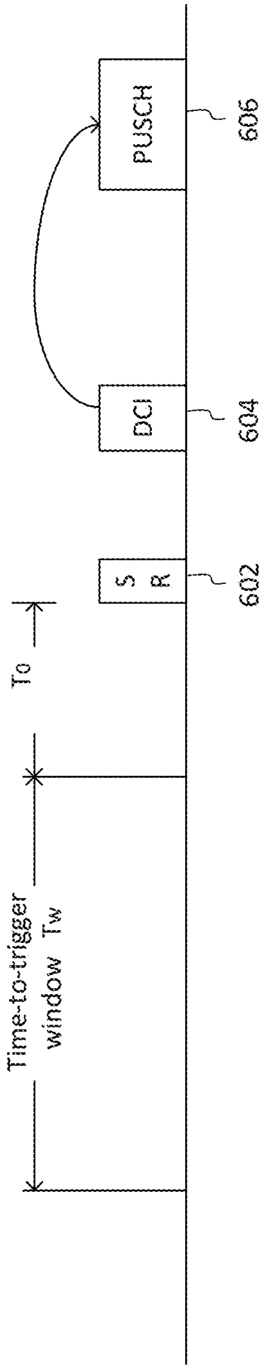
FIG. 6 is a diagram illustrating triggering of a CSI report using a dedicated SR resource, according to an embodiment.

FIG. 6 is a diagram illustrating triggering of a CSI report using a dedicated SR resource, according to an embodiment. An SR 602 is sent when an event is triggered in a previous time-to-trigger window $T_w$. Based on the SR 602, the gNB sends DCI 604 to trigger an aperiodic CSI report and resource allocation of a PUSCH 606 for measurement report for LTM.

Therefore, according to another embodiment, for an event-triggered LTM L1 measurement report sent via aperiodic CSI, a UE may send an SR to request an uplink resource for this report after the event is triggered. The UE may only send the SR when the triggered condition is fulfilled in the associated time-to-trigger window. The SR resource may be a dedicated configuration enabling the gNB to recognize that this request is for LTM report.

A strict time-to-trigger window may be avoided by using a next available SR resource after an event is triggered. The UE may send the SR on an earliest available SR resource having a starting point that is at least $T_0$ after the event is triggered.

When a medium access control (MAC) control element (CE) is used as the report carrier, from a physical layer's point of view, a MAC CE may treated as higher layer data to be transmitted through a PUSCH. There may not be a strict timeline for data processing of this content as long as the PUSCH processed time is satisfied. If LTM measurement reports are sent through the MAC CE, defining an additional timeline may not be necessary.

Semi-persistent CSI reports may be periodically sent by PUCCH to a gNB. A PUCCH as the content carrier may be supported for an L1 measurement report. The PUCCH resource may be configured in RRC and may use a similar timeline as described above for semi-persistent PUSCH.

Figure 7:
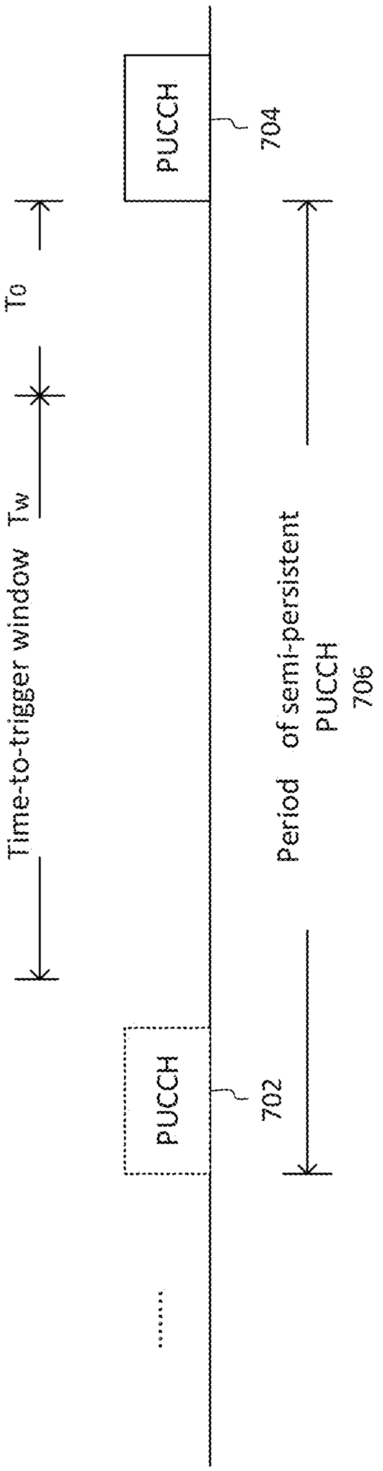
FIG. 7 is a diagram illustrating a time-to-trigger window for a semi-persistent CSI report, according to an embodiment.

FIG. 7 is a diagram illustrating a time-to-trigger window for a semi-persistent CSI report, according to an embodiment. A first PUCCH 702 and a second PUCCH 704 are separated by a period 706. A time-to trigger window is the duration $T_w$ before the starting symbol of the second PUCCH 704, where $T_0$ is a gap for CSI processing and PUCCH preparation time. The second PUCCH 404 may only transmit if the event trigger condition is fulfilled during the time-to-trigger window $T_w$. Both $T_w$ and $T_0$ may be configured by the network subject to UE capability, including the capability for CSI processing time. Although FIG. 7 shows that the time-to-trigger window does not overlap with first PUCCH 702, it is possible for the window to overlap one or more previous PUCCH occasions A strict time-to-trigger window may be avoided by using a next available SR resource after an event is triggered, as described above. Specifically, for an event-triggered LTM L1 measurement report sent via semi-persistent CSI on PUCCH, the UE may use an earliest available PUCCH resource having a starting point that is at least $T_0$ after the event is triggered.

With respect to the enhancement of content for an L1 measurement report for LTM, an L1 measurement report belongs to CSI-reporting, which is a type of UCI. More specifically, the CSI report may be configured to report L1 measurement when the higher layer parameter reportQuantity is configured with cri-RSRP, ssb-Index-RSRP, cri-SINR, or ssb-Index-SINR. Enhancements may be provided for the content of an L1 measurement report when it is used for LTM. CSI transmitting over a PUSCH is used an example, embodiments are not limited thereto, and may include any transmission method for reporting an L1 measurement.

A CSI report may be separated into CSI part 1 and CSI part 2. CSI part 1 and part 2 may be separately encoded. In resource mapping, CSI part 1 may be allocated in a way such that it can be decoded first, and its content may be used to interpret CSI part 2. Also, during CSI multiplexing, when the two CSI resources overlap in time, CSI part 2 may be omitted subject to the priority order (e.g., because the content in CSI part 1 is more 'mission critical' than the content in CSI part 2).

When a CSI report is configured to report L1 measurement results (i.e., higher layer parameter reportQuantity is configured with one of the values cri-RSRP, ssb-Index-RSRP, cri-SINR, or ssb-Index-SINR), the CSI report may only consist of CSI part 1 and it is not subject to the omitting procedure during CSI multiplexing.

When an L1 measurement report is used for LTM, the associated measurement objects, which include those in neighboring cells, may be larger than the typical objects for non-LTM usage. Accordingly, it may be beneficial to separate the corresponding report into CSI part 1 and CSI part 2. CSI part 2 may include the report, such that the beams, which are less critical, can still be used by the network to optimize the LTM procedure.

When CSI reporting on a PUSCH comprises two parts, the UE may omit a portion of CSI part 2. Omission of CSI part 2 may be according to a priority order shown in Table 4 below, where $N_{Rep}$ is the number of CSI reports configured to be carried on the PUSCH.

TABLE 4

| |
|---|
| Priority 0: |
| For CSI reports 1 to $N_{Rep}$, Group 0 CSI for CSI reports configured as 'typeII-r16', 'typeII-PortSelection-r16' or 'typeII-PortSelection-r17'; Part 2 wideband CSI for CSI reports configured otherwise |
| Priority 1: |
| Group 1 CSI for CSI report 1, if configured as 'typeII-r16', 'typeII-PortSelection-r16' or 'typeII-PortSelection-r17'; Part 2 subband CSI of even subbands for CSI report 1, if configured otherwise |
| Priority 2: |
| Group 2 CSI for CSI report 1, if configured as 'typeII-r16', 'typeII-PortSelection-r16' or 'typeII-PortSelection-r17'; Part 2 subband CSI of odd subbands for CSI report 1, if configured otherwise |
| Priority 3: |
| Group 1 CSI for CSI report 2, if configured as 'typeII-r16', 'typeII-PortSelection-r16' or 'typeII-PortSelection-r17'; Part 2 subband CSI of even subbands for CSI report 2, if configured otherwise |
| Priority 4: |
| Group 2 CSI for CSI report 2, if configured as 'typeII-r16', 'typeII-PortSelection-r16' or 'typeII-PortSelection-r17'. Part 2 subband CSI of odd subbands for CSI report 2, if configured otherwise |
| . |
| . |
| . |
| Priority $2N_{Rep} - 1$: |
| Group 1 CSI for CSI report $N_{Rep}$, if configured as 'typeII-r16', 'typeII-PortSelection-r16' or 'typeII-PortSelection-r17'; Part 2 subband CSI of even subbands for CSI report $N_{Rep}$, if configured otherwise |
| Priority $2N_{Rep}$: |
| Group 2 CSI for CSI report $N_{Rep}$, if configured as 'typeII-r16', 'typeII-PortSelection-r16' or 'typeII-PortSelection-r17'; Part 2 subband CSI of odd subbands for CSI report $N_{Rep}$, if configured otherwise |

If there is a new CSI part 2 for an L1 measurement report used for LTM, a new priority order may be defined for this new entry. Since a UE may be in a status that may lead to radio link failure (RLF) when the LTM related measurement is configured, all content related LTM may be treated as a higher priority. Accordingly, when determining the priority order of CSI part 2 of an L1 measurement for LTM, it may have a higher priority than the existing CSI part 2 associated with CSI feedback (e.g., type I, type II, enhanced type II or further enhanced type II CSI).

A semi-persistent CSI report to be carried on a PUSCH has a lower priority than a PUSCH data transmission and will be dropped when they overlap in time.

When an L1 measurement report for LTM is sent through a semi-persistent CSI report carried on a PUSCH, this priority order may be revised. Given that the measurement for LTM may lead to a serving cell change and in order to avoid potential RLFs, the PUSCH used to transmit the L1 measurement report for LTM may have a higher priority.

Accordingly, an L1 measurement report for LTM sent through semi-persistent CSI report carried on PUSCH, may have a higher priority than a PUSCH including only UL-SCH. As a consequence, the later will be dropped when the two PUSCH are overlapping in time.

Figure 8:
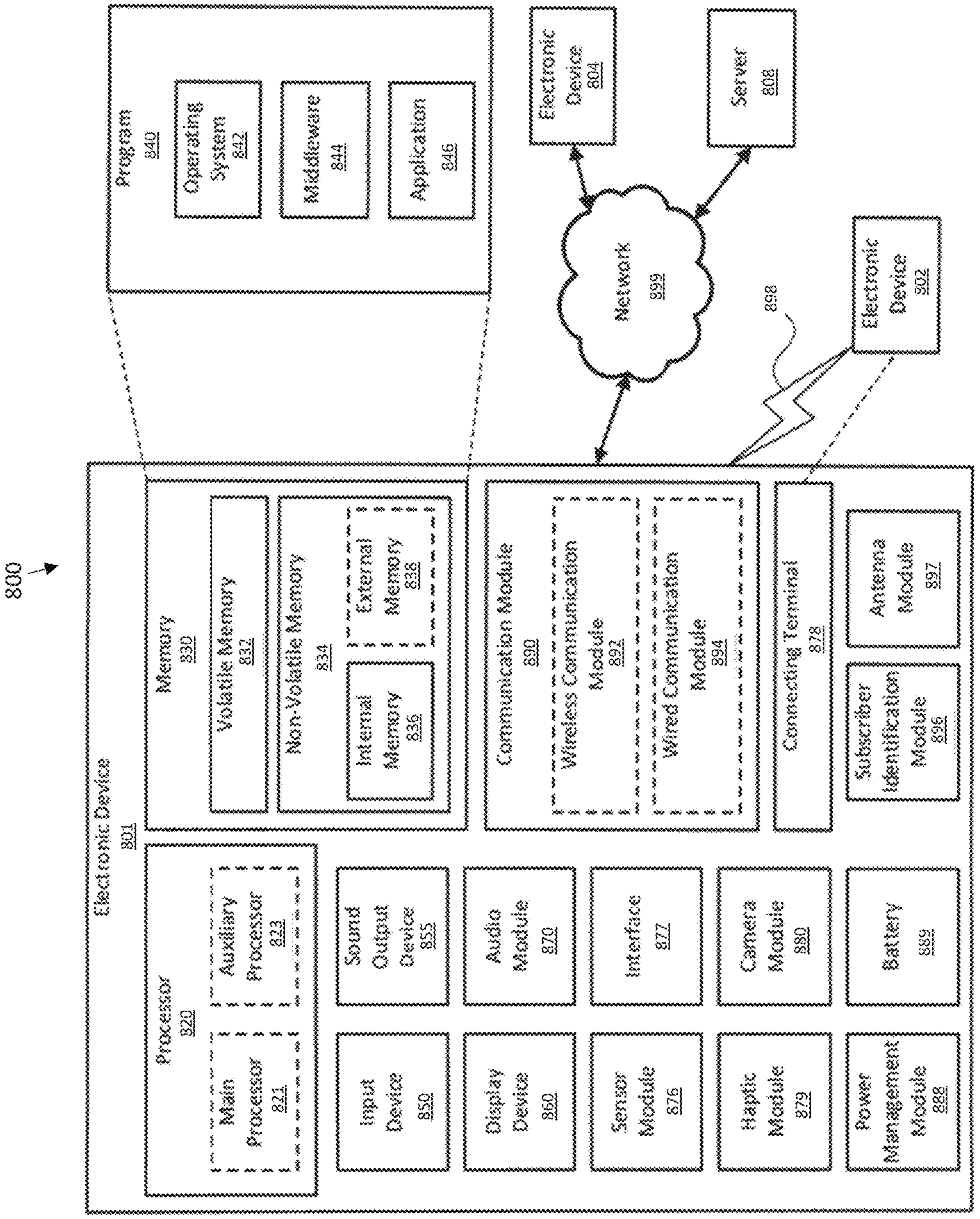
FIG. 8 is a block diagram of an electronic device in a network environment, according to an embodiment.

FIG. 8 is a block diagram of an electronic device in a network environment 800, according to an embodiment.

Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device may be embodied as the UE described above with respect to FIGS. 1-3. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) card 896, or an antenna module 897. In one embodiment, at least one (e.g., the display device 860 or the camera module 880) of the components may be omitted from the electronic device 801, or one or more other components may be added to the electronic device 801. Some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute software (e.g., a program 840) to control at least one other component (e.g., a hardware or a software component) of the electronic device 801 coupled with the processor 820 and may perform various data processing or computations.

As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). The auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834. Non-volatile memory 834 may include internal memory 836 and/or external memory 838.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850 or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high-definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezoelectric element, or an electrical stimulator.

The camera module 880 may capture a still image or moving images. The camera module 880 may include one or more lenses, image sensors, image signal processors, or flashes. The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

detecting, by a user equipment (UE), that a condition for triggering a layer-1 (L1) measurement report transmission is satisfied based on a layer-3 (L3) measurement;

determining, by the UE, whether the condition is detected over a first duration based on an L1 measurement, in response to detecting that the condition, based on the L3 measurement, is held for a second duration; and transmitting, by the UE, the measurement report, in case that the condition is detected over the first duration.

2. The method of claim 1, wherein detecting that the condition is satisfied comprises:

determining, by the UE, whether the condition is satisfied based on the L3 measurement; and determining, by the UE, whether the condition, based on the L3 measurement, is held for the second duration, in case that the condition is satisfied, wherein the UE determines whether the condition, based on the L1 measurement, is detected over the first duration, in case that the condition, based on the L3 measurement, is held for the second duration.

3. The method of claim 2, wherein:

the first duration is at least a portion of the second duration, and the measurement report is transmitted via semi-persistent or aperiodic channel state information (CSI) on a physical uplink shared channel (PUSCH) or a physical uplink control channel (PUCCH), and the second duration is a window having an ending symbol that is separated by a gap from a starting symbol of the PUSCH or the PUCCH; or the first duration is after the second duration, and the measurement report is transmitted via semi-persistent or aperiodic CSI on the PUSCH or the PUCCH, and the first duration is the window having the ending symbol that is separated by the gap from the starting symbol of the PUSCH or the PUCCH.

4. The method of claim 3, wherein the window and the gap are configured by a network based on UE capabilities, and the gap is configured based on at least UE capabilities for a CSI processing time and a PUSCH or PUCCH preparation time.

5. The method of claim 3, in case that the measurement report is transmitted via aperiodic CSI on the PUSCH, further comprising receiving, by the UE, downlink control information (DCI) triggering the PUSCH.

6. The method of claim 2, wherein the measurement report is transmitted via aperiodic CSI on a PUSCH, and further comprising:

transmitting, by the UE, a scheduling request (SR), wherein:

in case that the first duration is at least a portion of the second duration, the second duration is a window having an ending symbol that is separated by a gap from a starting symbol of the SR; and in case that the first duration is after the second duration, the first duration is the window having the ending symbol that is separated by the gap from the starting symbol of the SR; and receiving, by the UE, DCI triggering the PUSCH.

7. The method of claim 1, wherein the measurement report is transmitted via CSI on PUSCH, and the CSI is split into a first part and a second part.

8. The method of claim 7, wherein the second part is multiplexed with other CSI, and the measurement report has a higher priority than the other CSI.

9. The method of claim 1, wherein the measurement report is transmitted via semi-persistent CSI on PUSCH, and the measurement report has a higher priority than uplink (UL)-shared channel (SCH)-only PUSCH.

10. The method of claim 1, wherein detecting whether the condition is detected over the first duration comprises:

detecting that the condition is held continuously over the first duration; or detecting a predetermined number of instances of the condition over the first duration, wherein the first duration begins at a first instance of the condition or the first duration is predefined based on a timeline, and wherein transmission of the measurement report is triggered after a last instance of the predetermined number of instances over the first duration.

11. A user equipment (UE) comprising:

a processor; and a non-transitory computer readable storage medium storing instructions that, when executed, cause the processor to:

detect that a condition for triggering a layer-1 (L1) measurement report transmission is satisfied based on a layer-3 (L3) measurement;

determine whether the condition is detected over a first duration based on an L1 measurement, in response to detecting that the condition, based on the L3 measurement, is held for a second duration; and transmit the measurement report, in case that the condition is detected over the first duration.

12. The UE of claim 11, wherein, in detecting that the condition is satisfied, the instructions further cause the processor to:

determine whether the condition is satisfied based on the L3 measurement; and determine whether the condition, based on the L3 measurement, is held for the second duration, in case that the condition is satisfied;

wherein the processor determines whether the condition, based on the L1 measurement, is detected over the first duration, in case that the condition, based on the L3 measurement, is held for the second duration.

13. The UE of claim 12, wherein:

the first duration is at least a portion of the second duration, and the measurement report is transmitted via semi-persistent or aperiodic channel state information (CSI) on a physical uplink shared channel (PUSCH) or a physical uplink control channel (PUCCH), and the second duration is a window having an ending symbol that is separated by a gap from a starting symbol of the PUSCH or the PUCCH; or the first duration is after the second duration, and the measurement report is transmitted via semi-persistent or aperiodic CSI on the PUSCH or the PUCCH, and the first duration is the window having the ending symbol that is separated by the gap from the starting symbol of the PUSCH or the PUCCH.

14. The UE of claim 13, wherein the window and the gap are configured by a network based on UE capabilities, and the gap is configured based on at least UE capabilities for a CSI processing time and a PUSCH or PUCCH preparation time.

15. The UE of claim 13, in case that the measurement report is transmitted via aperiodic CSI on the PUSCH, the instructions further cause the processor to receive downlink control information (DCI) triggering the PUSCH.

16. The UE of claim 12, wherein the measurement report is transmitted via aperiodic CSI on a PUSCH, and the instructions further cause the processor to:

transmit a scheduling request (SR), wherein:

in case that the first duration is at least a portion of the second duration, the second duration is a window having an ending symbol that is separated by a gap from a starting symbol of the SR; and in case that the first duration is after the second duration, the first duration is the window having the ending symbol that is separated by the gap from the starting symbol of the SR; and receive DCI triggering the PUSCH.

17. The UE of claim 11, wherein the measurement report is transmitted via CSI on PUSCH, the CSI is split into a first part and a second part, the second part is multiplexed with other CSI, and the measurement report has a higher priority than the other CSI.

18. The UE of claim 11, wherein the measurement report is transmitted via semi-persistent CSI on PUSCH, and the measurement report has a higher priority than uplink (UL)-shared channel (SCH)-only PUSCH.

19. The UE of claim 11, wherein, in determining whether the condition is detected over the first duration, the instructions further cause the processor to:

detect that the condition is held continuously over the first duration; or detect a predetermined number of instances of the condition over the first duration, wherein the first duration begins at a first instance of the condition or the first duration is predefined based on a timeline, and wherein transmission of the measurement report is triggered after a last instance of the predetermined number of instances over the first duration.

20. A method comprising:

determining, by a user equipment (UE), whether a condition for triggering a layer-1 (L1) measurement report transmission is held for a first duration, based on a layer-3 (L3) measurement, and determining, by the UE, whether the condition is detected over a second duration, based on an L1 measurement, in response to determining that the condition is held for the first duration; and transmitting, by the UE, the measurement report, in case that the condition is held for the first duration and detected over the second duration.

* * * * *